United States Patent [19]

Alecci et al.

[11] Patent Number: 6,097,384
[45] Date of Patent: Aug. 1, 2000

[54] METHOD AND SYSTEM FOR REDUCING MEMORY REQUIREMENTS BY USING SEPARATE SPECIFICATION AND STORAGE OF DEFAULT AND OVERRIDING ATTRIBUTES

[75] Inventors: Donald Vincent Alecci, Landing; Ross Jay Hilbert, Whippany; Richard Joseph Smolucha, West Milford, all of N.J.

[73] Assignee: Novell, Inc., Provo, Utah

[21] Appl. No.: 08/431,307

[22] Filed: Apr. 28, 1995

Related U.S. Application Data

[63] Continuation of application No. 08/164,616, Dec. 9, 1993, abandoned, which is a continuation of application No. 08/004,488, Jan. 14, 1993, abandoned, which is a continuation of application No. 07/742,149, Aug. 1, 1991, abandoned, which is a continuation of application No. 07/468,435, Jan. 22, 1990, abandoned.

[51] Int. Cl.[7] .............................. G06F 3/00; G06F 9/445
[52] U.S. Cl. ......................... 345/333; 345/335; 345/340; 345/339; 709/302; 706/55
[58] Field of Search .................................. 395/155, 157, 395/159, 156, 160, 700, 62, 65; 345/119, 112, 333–335, 339, 340, 342, 348, 356, 352; 709/302, 303; 706/59, 50, 55

[56] References Cited

U.S. PATENT DOCUMENTS

| | | | |
|---|---|---|---|
| 4,692,858 | 9/1987 | Redford et al. | 364/200 |
| 4,866,638 | 9/1989 | Cosentino et al. | 364/521 |
| 4,890,098 | 12/1989 | Dawes et al. | 340/721 |
| 5,041,992 | 8/1991 | Cunningham et al. | 364/518 |
| 5,072,412 | 12/1991 | Henderson, Jr. et al. | 395/159 |
| 5,119,475 | 6/1992 | Smith et al. | 395/156 |
| 5,121,478 | 6/1992 | Rao | 395/157 |
| 5,179,657 | 1/1993 | Dykstal et al. | 395/161 |
| 5,347,626 | 9/1994 | Hoeber et al. | 395/156 |

OTHER PUBLICATIONS

"Windowing System, Easy Windows", S. McGregor et al., *Systems Integration*, vol. 22, No. 10, Oct. 1989, pp. 58–64.

"Frames, Semantic Networks, and Object–oriented Programming in APL2", M. Alfonseca, *IBM Journal of Research and Development*, vol. 33, No. 5, Sep. 1989, pp. 502–510.

"The Newwave Office", B. Lam et al., *Hewlett–Packard Journal*, vol. 40, No. 4, Aug. 1989, pp. 23–31.

"Browsing a la carte in Object–Oriented Databases", E. Laenens et al., *The Computer Journal*, vol. 32, No. 4, Aug. 1989, pp. 333–340.

K. Parsaye et al., *Intelligent Databases*, Jan. 1989, pp. 105–135, 183–192.

Microsoft Windows Write User's Guide, Version 2.0, 1987, pp. 1–12, 31–58.

"Object–Oriented Programming: Themes and Variations", Stefik et al., *The AI Magazine*, Winter 1986, pp. 40–62.

(List continued on next page.)

*Primary Examiner*—Raymond J. Bayerl
*Attorney, Agent, or Firm*—Computer Law++

[57] ABSTRACT

A method used in a computer system for managing attribute data for subobjects of a class of data objects. When a data object is created, a set of default attributes are stored in internal memory in association with the data object for all instances of subobjects of the data object. A set of attributes for overriding the default attributes are stored in internal memory for each instance of a subobject. When a query or system response is required which requires knowledge of the attributes for an instance of a subobject, these final attributes are formed by fetching the default attributes associated with the data object and by overwriting the default attributes with the overriding attributes, if any, associated with the instance of the subobject. In a preferred embodiment, the invention is used in a computer windowing system in which windows are associated with data objects called widgets or gadgets and subobjects of the data objects are associated with items which are displayed within an associated window.

3 Claims, 4 Drawing Sheets

OTHER PUBLICATIONS

"Dictionary of Computers, Information Processing, and Telecommunications", J. Rosenberg, Ph.D., 2nd Edition, pp. 505, 554, 1987.

"Implementing Frames", P. Winston et al., *LISP*, Second Edition, 1984, pp. 311–320.

"Representing Commonsense Knowledge", P. Winston, *Artificial Intelligence*, Second Edition, 1984, pp. 251–270.

"Going for Baroque", D. Rosenthal, *UNIX Review*, pp. 71–79, Jun. 1988.

"Using the X Toolkit or How to Write a Widget", J. McCormack et al., Submitted to USENIX, summer 1988, pp. 1–12.

"Windows™ Internals The Implementation of the Windows Operating Environment", *Windows Internals*, M. Pietrek, index v–xii.

"Microsoft Window's Software Development Kit", *Programmer's Reference vol. IV, Resources*, pp. 107–115.

METHOD AND SYSTEM FOR REDUCING MEMORY REQUIREMENTS BY USING SEPARATE SPECIFICATION AND STORAGE OF DEFAULT AND OVERRIDING ATTRIBUTES

This is a continuation of application Ser. No. 08/164,616, filed Dec. 9, 1993, abandoned, which is a continuation of application Ser. No. 08/004,488, filed Jan. 14, 1993, abandoned, which is a continuation of application Ser. No. 07/742,149, filed Aug. 1, 1991, abandoned, which is a continuation of application Ser. No. 07/468,435, filed Jan. 22, 1990, abandoned.

TECHNICAL FIELD

The invention relates to computer graphics environments and particularly to computer systems arranged with environments for controlling "windowed" user interfaces to the underlying system and application programs.

BACKGROUND OF THE INVENTION

Bitmapped text and graphics applications are now commonplace. Such applications which provide for "windowing" are also available. "Windowing" is a technique whereby a visual display screen at a computer or terminal is partitioned into distinct, independent areas (windows), each generally being associated with a separately executing application program. One window is usually designated as the active windows into which data might be entered by a user, for example, while other windows may be temporarily idle or engaged in other functions, such as outputting to a printer.

Typically, windows may be located anywhere on a screen, as desired by a user. Thus, several windows can be simultaneously present on the screen with various portions of some or all of the windows, except the active window, overlapping on the screen. The active window is traditionally fully exposed to the view of the user. Alternatively, windows might be arranged to be nonoverlapping (tiled).

One example of a windowing environment is the X Window system distributed by MIT. X Window defines the protocols and provides the software routines for message communications between system programs that accept user screen inputs, from a mouse for example, and an underlying application program. Some windowing environments also establish the look and feel of the user interface to applications. An example of this type of environment is the Presentation Manager marketed by IBM. Other environments, of which X Window is an example, merely establish the underlying windowing communications environment and leave the establishment of the user interface look and feel to other system programs. The OPEN LOOK (TM) Graphical User Interface (GUI) System, marketed by AT&T for its UNIX (R) operating system, is an example of the latter. In the OPEN LOOK GUI, a separate system program that defines the interface look and feel is layered onto the X Window software.

In most windowing environments, the user interface to applications programs is characterized by screen objects that communicate information to the user and allow user input to control the operations of the application program associated with the window. A set of menu buttons is one example of such an interface. The use of icons, such as trash cans, is another. In typical windowing environments such as the X windowing system, each of these objects is also associated with a separate window. Some portions of the industry have given such types of screen objects the name "widgets" and we adopt that nomenclature here for purposes of discussion. In other words, a screen object itself is a widget corresponding to an underlying application data structure; associated with the screen object is a window, which may be managed by a system window manager. In such a case, communications between the window manager and an application program is by means of messages describing user window operations or desired window outputs. As an example, suppose that an application program, such as a database manager, is associated with an active window 100 as shown in FIG. 1. The program may display a collection of menu buttons, such as shown at 104, 106, 108 and 110. These items are called buttons because the user typically selects one by pointing to it and clicking, as with the use of a mouse or other input device. When a user selects a button, the windowing environment creates a message describing the screen operation and sends it to the application program. The application, in turn, takes some appropriate action.

The menu buttons are contained within a box 102 which may or may not be visible in all cases. Box 102 is of a class which is associated with a container widget; that is, the box contains other windows which, in turn, are associated with other widgets. The boxes 100 and 102 are also windows. The box 100 will have associated with it attributes, such as a background color and a foreground color. If the box 100 is visible, it will also be associated with a pleasing and distinctive background color, etc. The menu buttons, such as 102, also have associated attributes such as background colors.

As discussed above, in the X Window system, it is intended that each screen object such as 100 through 110 are associated with separate widgets. It is up to the application program associated with the widgets first to create these widgets before they can be used through appropriate X Window system calls, and each widget carries with it a block of memory in which is stored essential information about the widget. Actually, the memory required for each widget is divided into two blocks, one block associated with a window server, the portion of the windowing environment that creates and transmits the window messages to applications and that updates the contents of a window on the screen in response to messages from an application, and a second block associated with the client, the application program. each block is typically 150 to 300 or more bytes. The number of created widgets at any given time in a system can be quite large (typically, in the hundreds). Therefore, the amount of internal memory required just to store the required widget data can be large. To reduce this memory burden, Digital Equipment Co. recently introduced the notion of "gadgets".

A gadget is similar to a widget, except that a gadget is not associated with its own window. Rather, one or more gadgets may be associated with a single window, which in turn is associated with a container widget. Thus, in FIG. 1, the menu buttons 104, 106, 108 and 110 could be implemented as gadgets contained within container widget 102. This shifts the burden of managing screen operations, i.e. button selections, that occur inside the window 102 to the application program associated with the window. For example, if a user operates menu button 104, the windowing system creates a message that an action has occurred at coordinates so-and-so within the widget 102 and transmits the message to the application. The meaning of the screen selection that occurred at coordinates so-and-so within the containing window must be decoded and administered by the application program, whereas this function is normally provided by the X Window system.

The use of gadgets has the potential to reduce dramatically the amount of memory that is required to store the attributes associated with widgets. This is so because each gadget is not associated with its own window, thereby eliminating the need to allocate memory for widgets that would otherwise be associated with the windows. Nevertheless, the amount of such memory required, even with gadgets, can be large because only memory associated with the window side server and not the application side (the widget side) has been saved.

SUMMARY OF THE INVENTION

The invention is a method used in a computer system for managing attribute data for subobjects of a class of data objects. When a data object is created, a set of default attributes are stored in internal memory in association with the data object for all instances of subobjects of the data object. A set of attributes for overriding the default attributes are stored in internal memory for each instance of a subobject. When a query or system response is required which requires knowledge of the attributes for an instance of a subobject, these final attributes are formed by fetching the default attributes associated with the data object and by overwriting the default attributes with the overriding attributes, if any, associated with the instance of the subobject.

In a preferred embodiment, the invention is used in a computer windowing system in which windows are associated with data objects called widgets or gadgets and subobjects of the data objects are associated with items which are displayed within an associated window. In this preferred embodiment, the computer system includes a window server for updating the screen windows. An application program wishing to update the contents of a window generates a window draw message for updating the window based on the final set of attribute values and transmits the message to the window server.

The invention dramatically reduces the memory required for managing attribute data associated with data objects, such as standard widgets and gadgets. This is accomplished by allowing an application program to specify certain widget or gadget attributes that augment predefined defaults. These attributes are stored only once in memory, rather than on a per instance basis as is done for standard widgets and gadgets, thus saving substantial amounts of memory.

DETAILED DESCRIPTION

Figure 1:
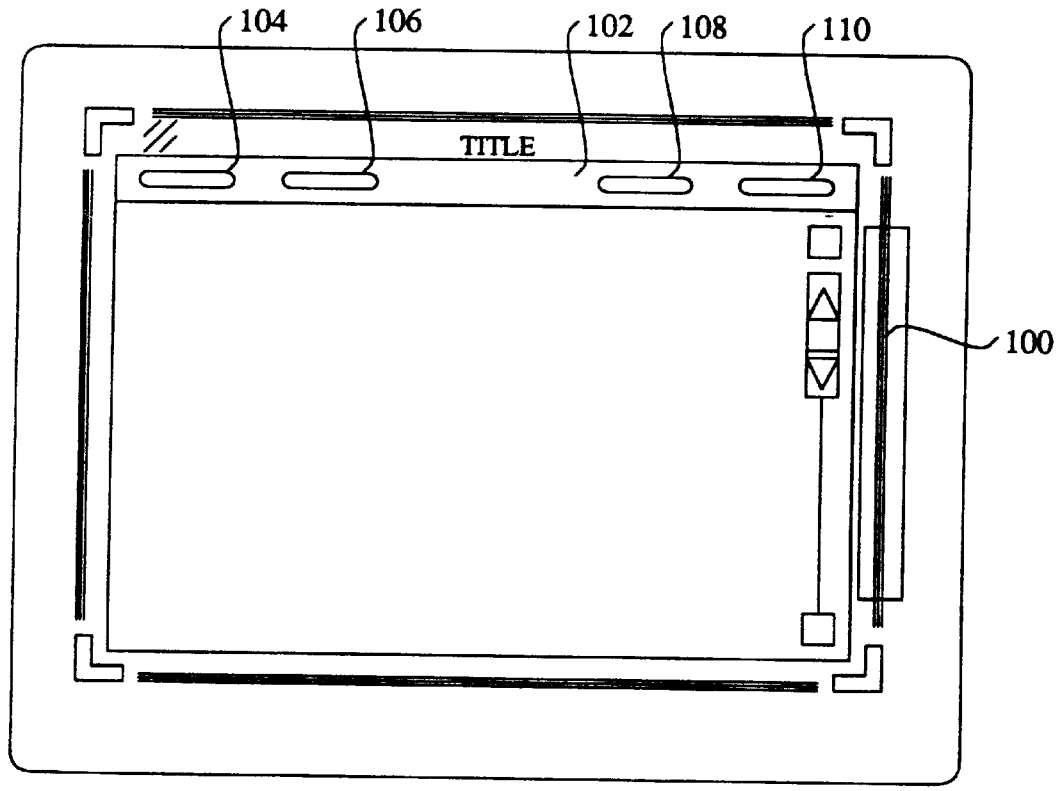
FIG. 1 shows an illustrative screen view of a typical windows interface to an applications program.

The X-Window system defines a protocol by which graphics window servers and application programs communicate. The system includes the X-library, which is a group of procedures that provide a procedural interface to the protocol. An application program executes procedures in the X-library to send window management and screen drawing messages to the server. The server sends event notifications to the application in response to user input actions, such as moving the mouse or selecting a menu button, and screen layout changes, such as window size or position change. Most windowing systems provide toolkits for the convenience of programmers. The toolkit, which is an interface to the raw windowing system procedures, enables programmers to cause a running application to generate easily widgets like labels, scroll bars, menu buttons, and to assemble these widgets into a complete user interface. During the creation of such widgets, an application can specify attributes like colors, fonts, border widths, and sizes for each widget or for various sets of widgets.

The X windowing system and widgets are described in complete detail in documentation available from MIT. However, widgets are discussed briefly here for the convenience of the reader. A widget is the fundamental abstraction and data type of the X windowing system. It is a logical combination of a screen window and underlying state and attribute information. Some widgets display information, text or graphics, and others are merely containers for other widgets. Some widgets are output-only and do not react to pointer or keyboard input. Others change their screen contents in response to user input and can invoke callback procedures that an application has attached to the widgets.

A core widget contains a set of definitions and default attributes that are common to all widgets. In other words, all widgets are subclasses of the core widget. A composite widget is a subclass of the core widget and is intended to act as a container for other widgets. Constraint widgets are a subclass of composite widgets that include additional definitions and default attributes.

A collection of widget instances constitutes a widget tree. Widgets are created with calls to the toolkit. A shell, or toplevel, widget returned by the create procedure is the root of the tree instance. The widgets with one or more children are the intermediate nodes of the tree and the widgets with no children of any kind are the leaves of a widget tree. Each node of the tree has associated with that instance all the definitions and default attributes of the core widget and other widget subclasses of which it is a member. All this will become clearer during the discussion of example widget trees in conjunction with the drawing.

Figure 2:
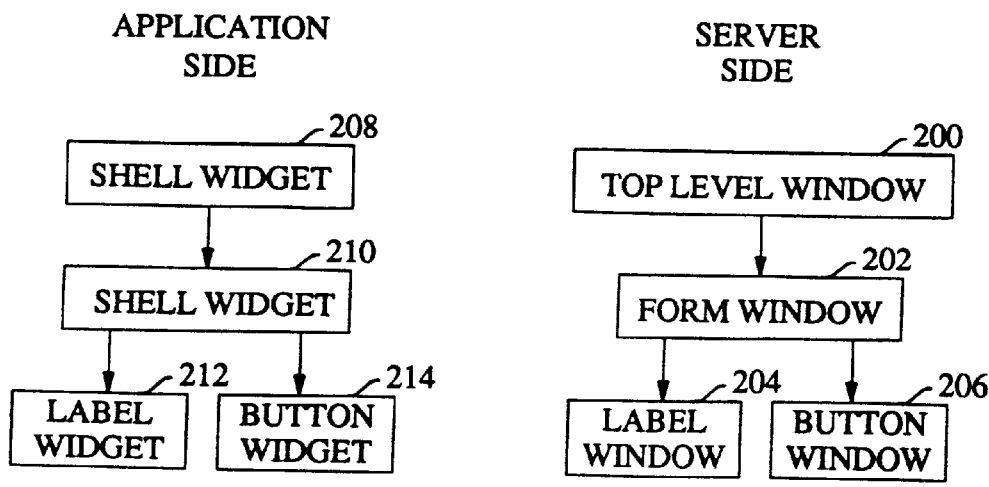
FIG. 2 illustrates the hierarchical tree nature of instances of widgets which are defined on the applications side of a windowing environment and the corresponding window tree defined on the window server side for a standard widget system.

The creation and destruction of specific instances of widget trees as they are used by a program consumes time and may undesirably slow down the operation of the program. For this reason, each instance of a widget tree that an application might use during its execution is usually created when the application is first started and left open for the lifetime of the program. An application typically may use hundreds of instances of widgets in one or more trees. When created, the leaf nodes of an instance of a standard widget tree has associated with it two blocks of memory, one associated with the application and one associated with the window server. FIG. 2 shows an instance of a tree, actually two trees, a window tree associated with the server side and a widget associated with an application. The internal nodes of the widget tree (208, 210) are composite widgets which are concerned with managing the size and position on the screen of their child widgets 212, 214. The nodes 212, 214 are instance specific widgets. Instance specific widgets can have no children and are used to control user input and output from and to the screen. Widget 208 owns the window 200, 210 owns 202 and so on.

This widget tree format will be described in connection with the coding example of Appendix A, which shows an illustrative X-windows application program for creating and using standard widgets. This sample program was created by Joel McCormack and Paul Asente for a presentation at the 1988 summer USENIX Conference and is written in the C programming language. The program creates two menu button standard widgets and, on an appropriate selection of a user, merely prints to the screen a message "Goodbye, world". The program then exits.

In lines 3 through 7, pg. 10 of Appendix A, "Intrinsic.h" is a header file that contains the definitions needed for applications to use a toolkit, "StringDefs.h" contains predefined strings used as resource names and "Form.h", "Label.h", and "Command.h" contain the definitions needed to use these widgets. The procedure "Callback" at lines 8 through 13, pg. 10, establishes a procedure that is called by the Toolkit when a button is depressed by the user. In this specific example, Callback, when called, merely prints the goodbye message and exits.

The main program beginning at line 14, pg. 10 declares four widgets, toplevel, box, label, and command. These declarations define the widgets for later toolkit creation. Each application needs a special top level widget (208 in FIG. 2) that holds exactly one child, the form window widget 210. At line 18, pg. 10, the application calls the toolkit command "XtInitialize" to initialize the toolkit. XtInitialize establishes a connection with the X server and returns a toplevel widget, such as 208, for the application to use. At line 19, pg. 10 the toolkit command "XtCreateManagedWidget" creates a container widget, a Form widget named "box," as a child of toplevel. This container widget corresponds to 210 in FIG. 2. XtCreateManagedWidget takes five parameters: the name of the widget instance (box), the class of the widget (formWidgetClass), a widget to use as the parent (toplevel), a list of arguments to the widget that override the default attributes associated with the class, and the length of this list. "Box" has no extra arguments in this example and so NULL and 0 are passed as the last two parameters.

To create a label widget, the application provides window coordinates x, y and label argument values using a toolkit command "XtSetArg" at lines 21 through 23, pg. 10. The toolkit command "XtCreateManagedWidget" at line 24, pg. 10 creates a new widget, called "label," using box as its parent and the above argument values as attributes which override the default values of its class. The parameter "labelWidgetClass" of line 24, pg. 10 is a pointer to the default attributes associated with the widget class which are copied into the widget instance, and then attributes are permanently stored with the instance of the widget.

Figure 3:
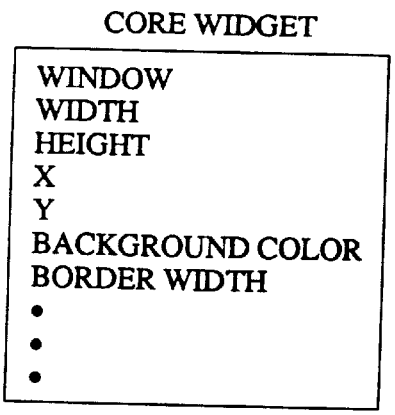
FIG. 3 shows an illustrative set of default attributes that might be associated with a core widget, i.e., a widget from which all other widgets descend.
Figure 4:
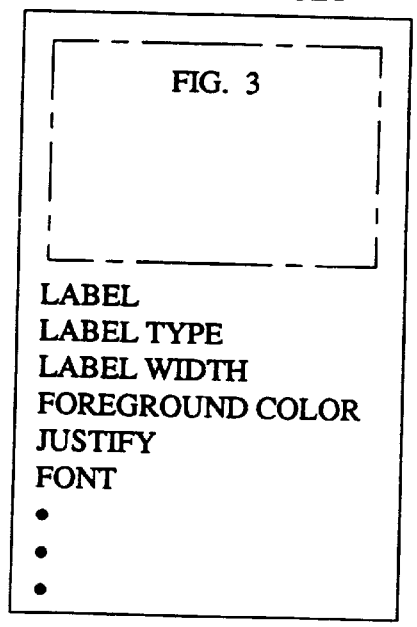
FIG. 4 shows an illustrative set of default attributes that might be associated with an instance of a label widget, i.e., a widget associated with a window that contains textual information within the window on the screen.
Figure 5:
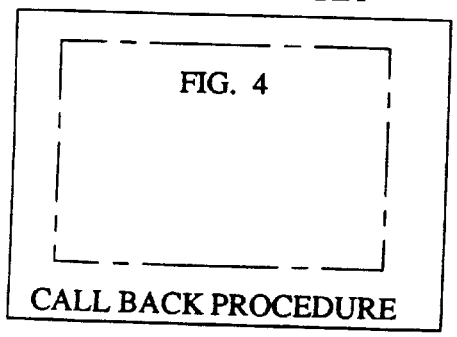
FIG. 5 shows an illustrative set of default attributes that might be associated with an instance of a button widget, i.e., a widget that can be selected (operated) by a user and which is associated with a window on the screen.

The application creates a command widget similarly at lines 26 through 29, pg. 10, then attaches the callback procedure "Callback" to it using the command "XtAddCallback" at line 30, pg. 10. As part of this function, appropriate data structures are allocated in internal memory for each widget. FIGS. 3 through 5 show examples of such data structures. For each label widget 212, part of this allocated memory is set aside for attributes such as foreground color, label type (string), label height, label width, etc., as shown in FIG. 4. For command widgets 214, a similar set of attributes including all the attributes of label widgets would be set aside. The label and button attributes are derived from the core attributes set forth in FIG. 3 that define the widget class, except where in the implementing code of the application, attribute values other than the default values in the core definition are specified. The effect of this arrangement is that a separate block of memory is allocated for each instance of a label and button widget, such as 212 and 214, in an application and each such block of memory contains space for all the attributes of the widget class.

So far, the application of Appendix A has resulted in the creation of the application widget tree shown in FIG. 2. However, the related windows are not yet created. When the "XtRealizeWidget" command at line 31, pg. 10 of Appendix A is executed, the code underlying the XtRealizeWidget command evaluates the widget tree of FIG. 2 and creates the actual windows for each node of the widget tree.

Figure 6:
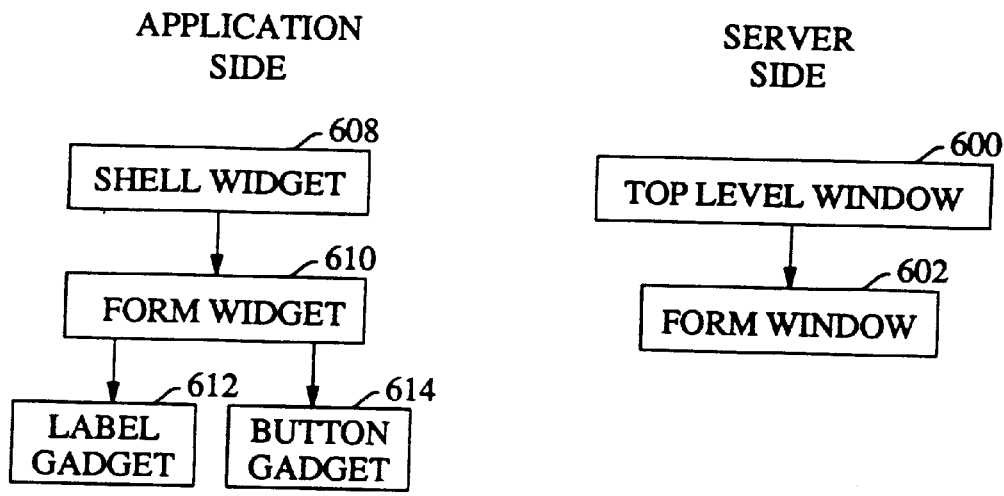
FIG. 6 illustrates the hierarchical tree nature of instances of gadgets which are defined on the applications side of a windowing environment and the corresponding window tree defined on the window server side for a system implementing gadgets.

A modification of the program of Appendix A to use "gadgets", rather than widgets, is shown in Appendix B. The only difference between the program of Appendix A and Appendix B is the substitution of the phrase "labelGadgetClass" for "labelWidgetClass" and commandGadgetClass for commandWidgetClass in the XtCreateManagedWidget toolkit command of lines 24 and 29, pg. 10, respectively. "LabelGadgetClass" is a pointer to the default attributes associated with the widget class which are copied into this gadget instance, and these attributes are permanently stored with the instance, as with widgets. The effect of this substitution is that the application side widget tree of FIG. 2 is still retained, as shown in FIG. 6. However, the server side tree no longer contains windows associated with the label widget and the button widget. This is because the server does not need to know the details of the objects inside the containing form widget 610. The administration of these objects is the responsibility of the application, in accordance with the attribute data associated with the 612 and 614 gadgets. Application code for administering these internal objects is not shown in Appendix B. The use of "gadgets" effects a savings in internal memory associated with the server label and button windows that would otherwise have to be provided in a standard widget implementation.

Figure 7:
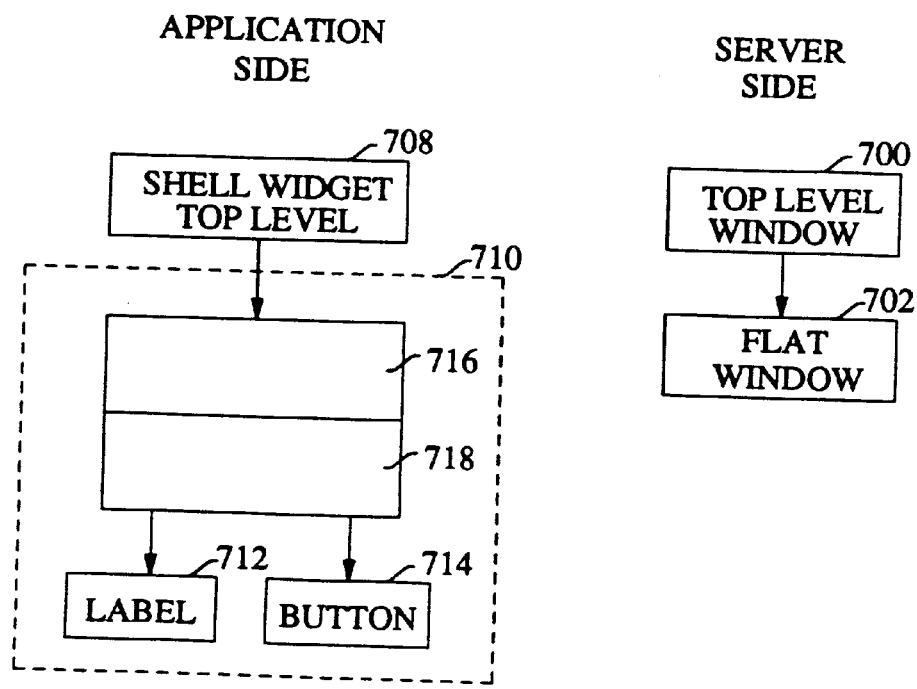
FIG. 7 illustrates the hierarchical tree nature of instances of flattened widgets in accordance with the invention which are defined on the applications side of a windowing environment and the corresponding window tree defined on the window server side for a system implementing flattened widgets.

A modification of the program of Appendix A to use "flattened widgets" in accordance with the invention, rather than standard widgets or gadgets, is shown in Appendix C. The difference between the program of Appendix A and Appendix C is the substitution of different code in the lines 19 through 30, pg. 10, inclusive, in Appendix A. The effect of this substitution is that the default attributes associated with this widget class are not copied into this widget instance. Only the overriding attributes are stored with the instance, and in this example, are actually stored as part of the C code, as discussed below. The resulting flattened widget trees are shown in FIG. 7. On the server side, the window tree still consists of a toplevel window 700 and a flat window 702, equivalent to those of the widget and gadget embodiments of FIGS. 2 and 6. On the application side, the toplevel widget 708 is equivalent to the standard widget 208 and the gadget 608. The flat widget 710 comprises four sections. Section 716 stores default attribute values for the flat widget, some of which are taken from the classes of which it is a member and others being specific to the flat widget. Section 718 stores default attribute values for the subobject buttons and labels. However, as shown in FIG. 7, there are now no separate widgets associated with the subject buttons and labels. Rather, overriding attributes specified as different from the default attributes for the subobjects that are stored in 718 are now stored in separate arrays 712 and 714 for the buttons and labels, respectively, which are attached to the widget 716/718. As mentioned above, the arrays 712 and 714 are actually part of the C code in Appendix C in this example. Specifically, line 27, pg. 13 of Appendix C corresponds to 712 and line 28, pg. 13 corresponds to 714. The size of 712 and 714 is specified by the number of arguments (lines 23 and 24, pg. 13) to the typedef statement at line 22, pg 13. However, it is not necessary that the arrays be part of the application code. For example, the arrays could be separately allocated at run time.

The elimination of the necessity of defining the subobject buttons and labels as widgets results in a substantial savings in internal memory. The smaller the number of overriding attributes in the arguments to typedef (line 22, pg. 13), or equivalently, the greater the number of static attributes, the greater the savings of internal memory required to store the widget attributes.

Figure 8:
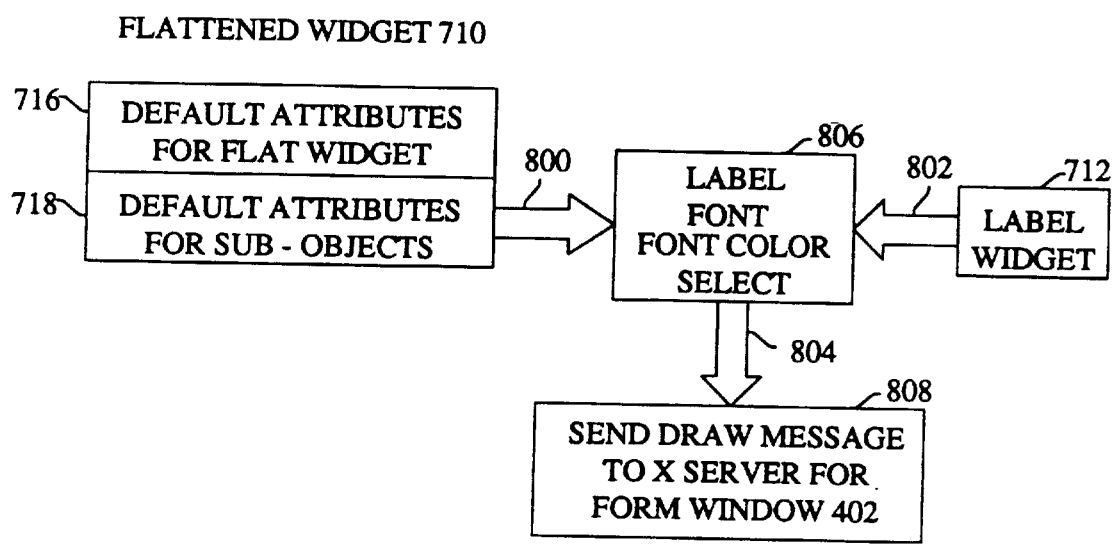
FIG. 8 shows a set of illustrative steps used to update a window with default attributes from a flattened widget and the overriding nonstatic attributes stored in association with an instance of the flattened widget.

FIG. 8 illustrates the steps performed in performing a screen update of a flattened widget. At the upper left of the Fig. is the flattened widget 710 from FIG. 4. At the upper right is the label widget 712 containing override attribute values, if any, to the default attributes for subobjects of the form widget stored in 718. The first step at 800 in performing a screen update or query of an attribute of a screen subobject is to copy the subobject default attribute values to a scratch memory area 806. Next, at step 802, the overriding attributes, if any, are substituted for the corresponding default attributes by coping the overriding attributes from the appropriate array, here from array 712, into the appropriate slots of the scratch memory 806. Finally, a draw message or response message is generated at 808 according to conventional procedures, but using the attributes from the scratch memory, and the message is sent to the requester, such as the X server to refresh the appropriate screen window.

It is to be understood that the above described arrangements are merely illustrative of the application of principles of the invention and that other arrangements may be devised by workers skilled in the art without departing from the spirit and scope of the invention.

APPENDIX A

SAMPLE WIDGET PROGRAM

```
#include "Intrinsic.h"
#include "StringDefs.h"
#include "Form.h"
#include "Label.h"
#include "Command.h"
void Callback(widget, clientData, callData)
```

APPENDIX A-continued

SAMPLE WIDGET PROGRAM

```
    Widget widget;
    caddr_t clientData, call Data;
{
    (void) printf("Goodbye, cruel world\n");
    exit(0); }
    int main(argc, argv) unsigned int argc; char **argv; {
    Widget toplevel, box, label, command;
    Arg arg[25];
    unsigned int n;
toplevel = XtInitialize("goodbye","Goodbye",NULL, 0, &argc, argv);
box = XtCreateManagedWidget("box",formWidgetClass, toplevel,
(Arg *)NULL, 0);
n=0;
XtSetArg(arg[n], XtNx, 10);       n++;
XtSetArg(arg[n], XtNy, 10);       n++;
XtSetArg(arg[n], XtNlabel, "Goodbye, world");  n++;
label = XtCreateManagedWidget("label",labelWidgetClass, box, arg, n);
n=0;
XtSetArg(arg[n], XtNx, 10);       n++;
XtSetArg(arg[n], XtNy, 40);       n++;
XtSetArg(arg[n], XtNlabel, "Click and die");   n++;
command = XtCreateManagedWidget("command",
commandWidgetClass, box, arg, n);
XtAddCallback(command, XtNcallback, Callback, NULL);
XtRealizeWidget(toplevel);
XtMainLoop(); }
```

APPENDIX B

SAMPLE GADGET PROGRAM

```
#include "Intrinsic.h"
#include "StringDefs.h"
#include "Form.h"
#include "Label.h"
#include "Command.h"
void Callback(widget, clientData, callData)
    Widget widget;
    caddr_t clientData, call Data;
{
    (void) printf("Goodbye, cruel world\n");
    exit(0);
} int main(argc, argv)
    unsigned int argc;
    char **argv;.
{
    Widget toplevel, box, label, command;
    Arg arg[25];
unsigned int n;
toplevel = XtInitialize("goodbye","Goodbye",Null, 0, &argc, argv);
box = XtCreateManagedWidget("box,formWidgetClass, toplevel,
(Arg *)NULL, 0);
n=0;
XtSetArg(arg[n], XtNx, 10);       n++;
XtSetArg(arg[n], XtNy, 10);       n++;
XtSetArg(arg[n], XtNlabel, "Goodbye, world")   n++;
label = XtCreateManagedWidget("label",labelGadgetClass, box, arg, n);
n=0;
XtSetArg(arg[n], XtNx, 10);       n++;
XtSetArg(arg[n], XtNy, 40);       n++;
XtSetArg(arg[n], XtNlabel, "Click and die");   n++;
command = XtCreateManagedWidget("command", commandGadgetClass,
box, arg, n);
XtAddCallback(command, XtNcallback, Callback, NULL);
XtRealizeWidget(toplevel);
XtMainLoop();
}
```

APPENDIX C

SAMPLE FLATTENED WIDGETS PROGRAM

```
#include "Intrinsic.h"
#include "StringDefs.h"
#include "Flat.h"
void Callback(widget, clientData, callData)
  Widget widget;
  caddr_t clientData, call Data;
{
  (void) printf("Goodbye, cruel world\n");
  exit(0);
}
int main(argc, argv)
  unsigned int argc;
  char **argv;
{
  Widget toplevel, box;
  Arg arg[25];
  unsigned int n;
toplevel = XtInitialize("goodbye","Goodbye",NULL, 0, &argc, argv);
static String fields [] = (XtNlabel, XtNselect);
  typedef struct {
    XtArgVal label;    /* test string */
    XtArgVal select;   /* function ptr */
  } Flatbutton;
static Flatbutton   buttons [2] = {
  {"Goodbye, World", (XtArgVal) NULL),
  {"Click and die", (XtArgVal) Callback}
};
n=0;
XtSetArg (arg[n], XtNitems, buttons);      n++;
XtSetArg (arg[n], XtNnumItems, 2);          n++;
XtSetArg (arg[n], XtNitemFields, fields);   n++;
XtSetArg (arg[n], XtNnumItemFields, 2);     n++;
box = XtCreateManagedWidget ("box", flatWidgetClass, toplevel, arg,n);
XtRealizeWidget(toplevel);
XtMainLoop();
}
```

What is claimed is:

1. In a computer system, a method of reducing internal memory requirements of a program during execution of the program, said method comprising the steps of:

specifying a set of default attributes prior to execution of the program;

specifying a set of one or more overriding attributes prior to execution of the program, said overriding attributes corresponding to selected default attributes such that at least one default attribute has no corresponding overriding attribute;

starting execution of the program;

storing values for each of the default attributes in a first internal memory of the computer system during execution of the program;

storing values for each of the overriding attributes in a separate second internal memory of the computer system during execution of the program; and building a set of final attributes from the default attributes and the overriding attributes during execution of the program by copying the default attributes to a scratch memory area and copying the overriding attributes into the scratch memory area such that each overriding attribute is substituted for its corresponding default attribute in the scratch memory area.

2. In a computer system, a method of reducing internal memory requirements of a program during execution of the program, said method comprising the steps of:

specifying a set of default attributes of a computer windowing system prior to execution of the program;

specifying a set of overriding attributes prior to execution of the program, said overriding attributes corresponding to selected default attributes such that at least one default attribute has no corresponding overriding attribute;

assigning a predetermined value to each of the overriding attributes prior to execution of the program;

starting execution of the program;

storing in a first internal memory of the computer system during execution of the program each of the predetermined values assigned during said assigning step;

storing values for each of the default attributes in a separate second internal memory of the computer system during execution of the program; and building a set of final attributes from the default attributes and the overriding attributes during execution of the program by copying the default attributes to a scratch memory area and copying the overriding attributes into the scratch memory area such that each overriding attribute is substituted for its corresponding default attribute in the scratch memory area, said method further characterized in that membership in the set of overriding attributes remains constant during execution of the program.

3. A computer system having an internal memory which contains data representing window attributes generated by the following method:

specifying a set of default attributes of a data object of an application program in a computer windowing system prior to execution of the program;

specifying a set of overriding attributes prior to execution of the program, said overriding attributes corresponding to selected default attributes such that at least one default attribute has no corresponding overriding attribute;

assigning a predetermined value to each of the overriding attributes prior to execution of the program;

starting execution of the program;

storing in a first internal memory of the computer system during execution of the program each of the predetermined values assigned during said assigning step;

storing values for each of the default attributes in a separate second internal memory of the computer system during execution of the program; and building a set of final attributes by copying the default attributes to a scratch memory area and then copying the overriding attributes into the scratch memory area such that each overriding attribute is substituted for its corresponding default attribute in the scratch memory area, said method further characterized in that membership in the set of overriding attributes remains constant during execution of the program.

* * * * *